(12) United States Patent
Koppal et al.

(10) Patent No.: US 11,800,205 B2
(45) Date of Patent: Oct. 24, 2023

(54) FAST FOVEATION CAMERA AND CONTROLLING ALGORITHMS

(71) Applicant: University of Florida Research Foundation, Incorporated, Gainesville, FL (US)

(72) Inventors: Sanjeev Jagannatha Koppal, Gainesville, FL (US); Zaid Tasneem, Gainesville, FL (US); Dingkang Wang, Gainesville, FL (US); Huikai Xie, Gainesville, FL (US); Brevin Jeffery Tilmon, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 476 days.

(21) Appl. No.: 16/844,597

(22) Filed: Apr. 9, 2020

(65) Prior Publication Data

US 2020/0336637 A1 Oct. 22, 2020

Related U.S. Application Data

(60) Provisional application No. 62/835,864, filed on Apr. 18, 2019.

(51) Int. Cl.
*G06T 7/80* (2017.01)
*H04N 23/45* (2023.01)
(Continued)

(52) U.S. Cl.
CPC ......... *H04N 23/45* (2023.01); *G02B 26/0841* (2013.01); *G03B 39/04* (2013.01);
(Continued)

(58) Field of Classification Search
CPC ............... H04N 5/2258; H04N 5/2254; H04N 5/23203; G06T 7/80; G06T 5/003; G02B 26/0841; G03B 39/04
See application file for complete search history.

(56) References Cited

U.S. PATENT DOCUMENTS

| 2007/0171483 A1* | 7/2007 | Oettinger | H04N 9/3129 358/474 |
| 2007/0211343 A1* | 9/2007 | Clark | G02B 5/04 359/577 |

(Continued)

OTHER PUBLICATIONS

Inoue "Motion-Blur-Free High-Speed Video Shooting using a Resonant Mirror", Oct. 29, 2017.*
(Continued)

*Primary Examiner* — James T Boylan
(74) *Attorney, Agent, or Firm* — Alston & Bird LLP

(57) ABSTRACT

Provided is a camera system to obtain high resolution imagery on multiple regions of interest even when the regions of interest are ate different focal depths and in different viewing directions. Embodiments include a high speed camera that operates by reflecting a beam of interest corresponding to a scene of interest into a high-speed passive sensor from a dynamic optical modulator. Embodiments described herein provide a foveating camera design that distributes resolution onto regions of interest by imaging reflections off a scanning micro-electromechanical system (MEMS) mirror. MEMS mirrors are used herein to modulate viewing direction. Embodiments include a camera capturing reflections off of a tiny, fast moving mirror.

24 Claims, 10 Drawing Sheets

(51) Int. Cl.
  *G03B 39/04* (2021.01)
  *G06T 5/00* (2006.01)
  *G02B 26/08* (2006.01)
  *H04N 23/55* (2023.01)
  *H04N 23/66* (2023.01)

(52) U.S. Cl.
  CPC .............. *G06T 5/003* (2013.01); *G06T 7/80* (2017.01); *H04N 23/55* (2023.01); *H04N 23/66* (2023.01)

(56) References Cited

U.S. PATENT DOCUMENTS

| | | | | |
|---|---|---|---|---|
| 2008/0074650 | A1* | 3/2008 | Fujihara | B81C 99/005 356/152.2 |
| 2011/0013300 | A1* | 1/2011 | Wu | G02B 26/0858 359/849 |
| 2012/0236379 | A1* | 9/2012 | da Silva | G02B 26/0841 359/200.8 |
| 2013/0200157 | A1* | 8/2013 | Nunnink | H04N 23/58 348/222.1 |
| 2014/0152793 | A1* | 6/2014 | Staker | H04N 25/441 348/79 |
| 2014/0218468 | A1* | 8/2014 | Gao | G03B 37/02 348/36 |
| 2015/0268464 | A1* | 9/2015 | Ranalli | G02B 26/127 348/36 |
| 2017/0264829 | A1* | 9/2017 | Zhou | H04N 3/08 |
| 2018/0113200 | A1* | 4/2018 | Steinberg | G01S 17/42 |
| 2018/0136314 | A1* | 5/2018 | Taylor | G01S 17/931 |
| 2018/0197278 | A1* | 7/2018 | Lee | G06T 5/20 |
| 2019/0104258 | A1* | 4/2019 | Cohen | H04N 23/75 |
| 2020/0225330 | A1* | 7/2020 | Zhang | G01S 7/4817 |
| 2021/0333405 | A1* | 10/2021 | Shia | G01S 7/484 |
| 2021/0405360 | A1* | 12/2021 | Kim | H04N 23/698 |

OTHER PUBLICATIONS

Okumura, Kohei et al. *High-Speed Gaze Controller for Millisecond-Order Pan/Tilt Camera*, 2011 IEEE International Conference on Robotics and Automation, May 9, 2011, pp. 6186-6191, Shanghai, China.

Hua, Hong et al. *Dual-Sensor Foveated Imaging System*, Applied Optics, vol. 47, No. 3, pp. 317-327, Jan. 20, 2008.

Nakao, Toshiyasu et al. *Panoramic Camera Using a Mirror Rotation Mechanism and a Fast Image Mosaicing*, in Proceedings 2001 International Conference on Image Processing (Cat. No. 01CH37205), vol. 2., pp. 10457-1048, IEEE 2001, Thessaloniki, Greece.

* cited by examiner

FAST FOVEATION CAMERA AND CONTROLLING ALGORITHMS

CROSS-REFERENCE TO RELATED APPLICATIONS

This application claims priority to U.S. Provisional Patent Application Ser. No. 62/835,864, filed on Apr. 18, 2019, the contents of which are hereby incorporated by reference in their entirety.

GOVERNMENT SUPPORT

This invention was made with government support under Grant 1514154 awarded by the National Science Foundation and under Grant N00014-18-1-2663 awarded by the U.S. Navy Office of Naval Research. The government has certain rights in the invention.

TECHNICAL FIELD

The present application relates to the technical field of high modulation speed, variable angular resolution cameras. In particular, the invention relates to high speed cameras/imaging sensors with fast movements. These can be, but are not limited to, real-time artificial saccadic movements. In addition, the invention allows for control algorithms that take the previous or current measurements and determines the optimal next measurements to be made to enable some sensing or imaging task.

BACKGROUND

Existing camera technologies suffer from an inability to offer variable angular resolution in combination with high speed modulation. As an example, FIG. 1 depicts a diagram of various existing cameras arranged according to their relative abilities with respect to variable angular resolution and high speed modulation. A limiting factor of existing cameras is their reliance on optomechanical components as indicated by line 5. The components fundamentally limit the speed with which existing cameras can "zoom" or otherwise adjust.

As a result, existing cameras are limited in their ability to identify what is visually important in a given scene and allocate visual attention to these important regions. There is therefore a need in the art for a camera that can offer artificial saccades via high speed foveation. Despite decades of saliency research in the human vision and computer vision communities, no strategy for learned models exist to extract scene importance for a set of visual tasks, at each time instance, for dynamic, complex scenes.

BRIEF DESCRIPTION OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Figure 1:
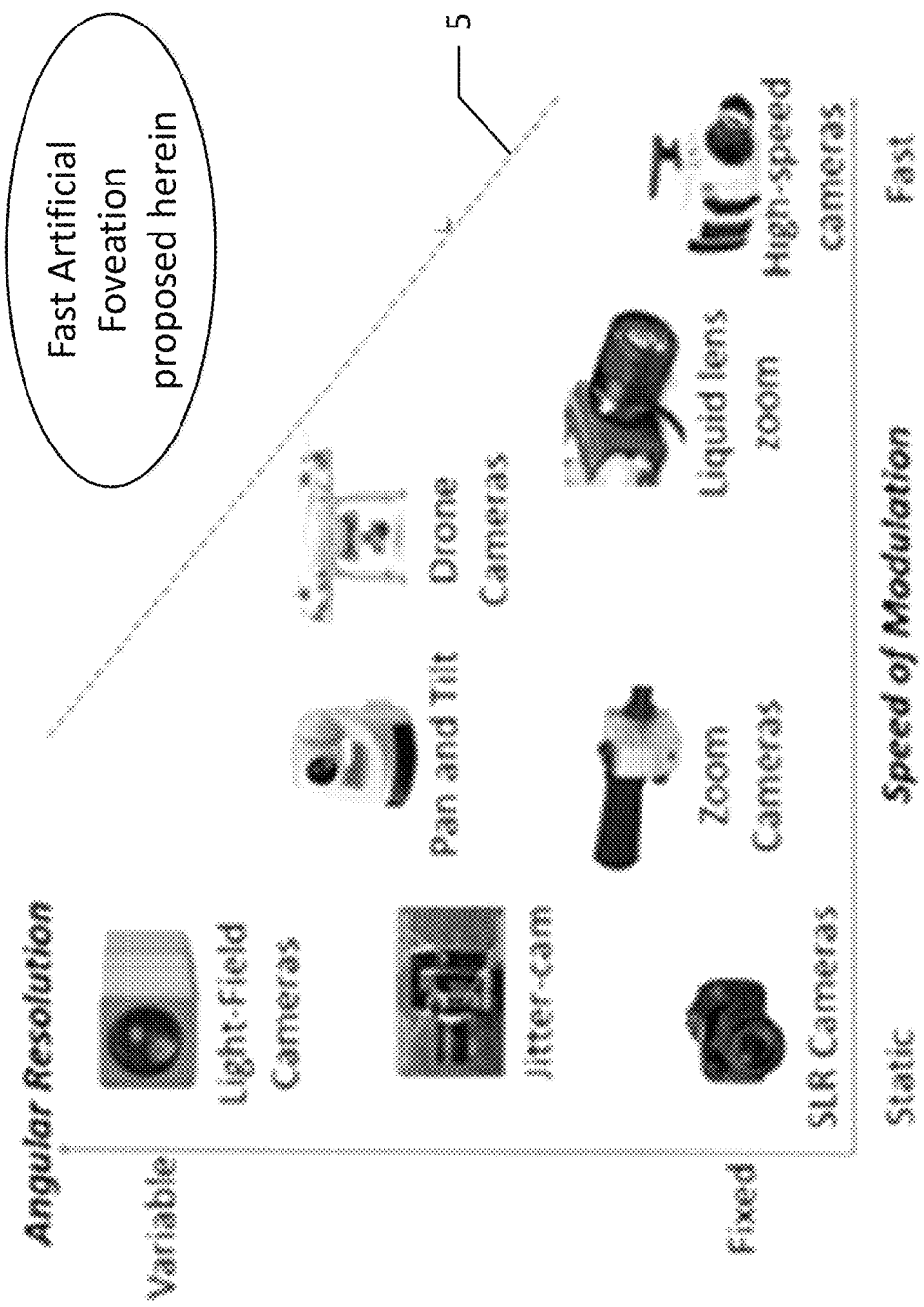
FIG. 1 is a diagram depicting the comparative capability of existing camera technologies.

Various embodiments described herein relate to a high speed camera with real-time movements. In an example embodiment, the real time movements include artificial saccadic movements. According to various embodiments, the high speed camera operates by reflecting a beam of interest corresponding to a scene of interest into a high-speed passive sensor from a dynamic optical modulator. In one embodiment, the passive sensor is a CCD or CMOS image sensor, and the optical modulator is a scanning mirror. In general the modulation frequency of the optical modulator is, but not limited, in the kHz range, which enables artificial saccades, even for dynamic scenes. In one embodiment, the fast modulation is provided by a scanning micro-electromechanical system (MEMS) mirror. FIG. 1 illustrates a comparison between the angular resolution and the speed of modulation of a fast foveation camera of the present disclosure compared to traditional cameras.

While conventional cameras capture images without considering scene content, human eyes have fast mechanical movements that control how a scene is imaged in detail by the fovea, where visual acuity is highest. This concentrates computational (i.e., neuronal) resources in places where they are needed most. Embodiments described herein provide a foveating camera design that distributes resolution onto regions of interest by imaging reflections off a scanning micro-electromechanical system (MEMS) mirror. MEMS mirrors are used herein to modulate viewing direction. Embodiments include a camera capturing reflections off of a tiny, fast moving mirror. Embodiments can obtain high resolution imagery on multiple regions of interest, even if these are at different depths and viewing directions.

MEMS mirrors are compact, have low-power performance, and move quickly. Speed, in particular, allows the capture of near-simultaneous imagery of dynamic scenes from different viewing directions. Further, the mirror moves faster than the exposure rate of most cameras, removing any visual cues that the viewpoint has changed from frame to frame. Effectively, the images from a single passive camera are interleaved from multiple virtual cameras, each corresponding to a different mirror position.

Leveraging the fast mirror speed to multiplex the viewpoint over multiple regions-of-interest (ROI) is only possible with a fast control strategy to decide which parts of the scene to capture at high resolution. Provided herein is an efficient robot planning algorithm for MEMS mirror control that can be optionally integrated with a target tracker. Rather than planning slow robot motion and varying PZT on a robot's onboard cameras, the control algorithms provided herein enable quick, computationally light-weight MEMS-mirror based changes of camera viewpoint for dynamic scenes.

Embodiments described herein demonstrate the camera's utility through remote eye-tracking, showing that multiplexing resolution with the disclosed embodiments results in higher fidelity eye-tracking. Remote eye tracking is an application that highlights the advantages of embodiments described herein for camera design and control algorithms. Human eyes are a relatively small ROI compared to faces and bodies, and eyes exhibit small and fast movements.

The present disclosure includes a novel sensor for dynamic scenes that temporarily distributes its angular resolution over the field of view using reflections off of a fast MEMS mirror. Embodiments further provide a model for robot control to change the MEMS mirror path for pairs of targets. The disclosed control algorithm is based on new closed form solutions for differential updates of the camera state. Embodiments include a gaze-tracking application created by fine tuning a recent eye-tracking neural network, demonstrating that our system enables better eye tracking at a three meter range compared to a high-resolution commercial smartphone camera at the same location with the same resolution.

Exemplary Fast Foveation Camera

Figure 2:
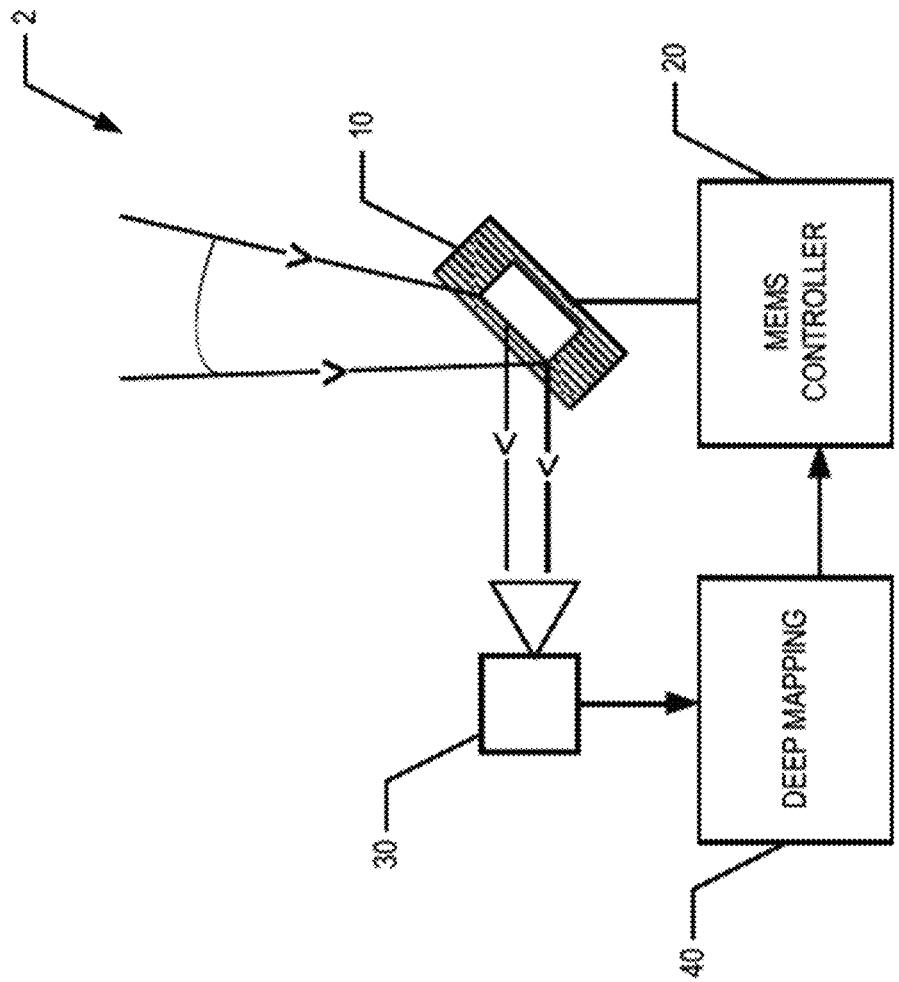
FIG. 2 is a schematic block diagram of a fast foveation camera according to various embodiments of the present disclosure.
Figure 3:
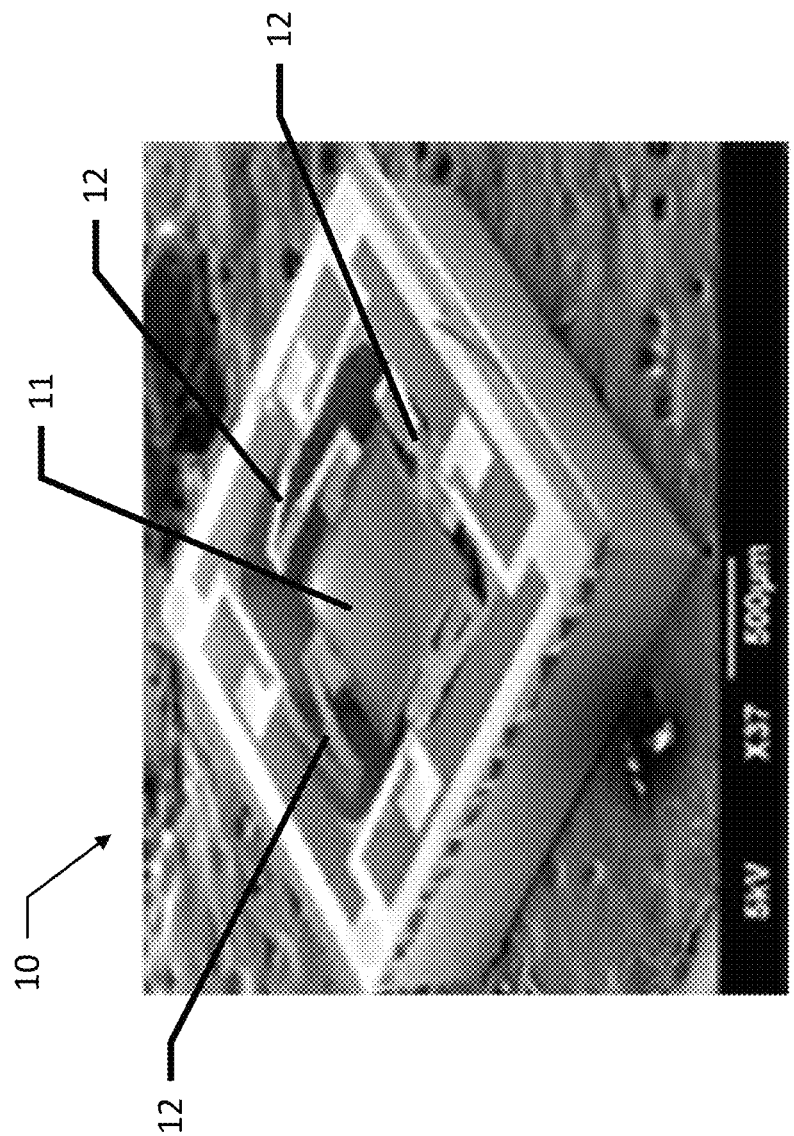
FIG. 3 illustrates an example MEMS mirror, consisting of a central mirror plate suspended by four micro-actuators according to various embodiments of the present disclosure.

FIG. 2 shows a block diagram of a fast foveation camera 2 according to one embodiment. As shown in FIG. 2, the fast foveation camera 2 includes a MEMS mirror (and/or MEMS mirror array) and modulator assembly 10 (herein "MEMS mirror 10"), a MEMS controller 20, a high speed passive sensor 30, and a deep mapping processor 40. In the illustrated embodiment, the MEMS mirror 10 functions as a dynamic optical modulator, actuated by the MEMS controller 20. Light is reflected by the MEMS mirror 10 into the high speed passive sensor 30. One example MEMS mirror is shown in FIG. 3, where a central reflective mirror plate 11 is suspended by four microactuators 12 on its four sides. Each of the microactuators 12 can be electrically controlled and set the height of the mirror plate 11 side to which it is anchored. With four microactuators 12 with properly tuned driving voltage signals, the mirror plate 11 can be tilted (or scanned) at any angle in an angular field of view set by the maximum tilt angle of the MEMS mirror. In an example embodiment, each of the microactuators is made of a folded thin-film beam.

Embodiments provided herein employ a MEMS swiveling mirror to direct the foveating camera viewpoint. The advantages of the MEMS mirror are speed and compactness.

Figure 4:
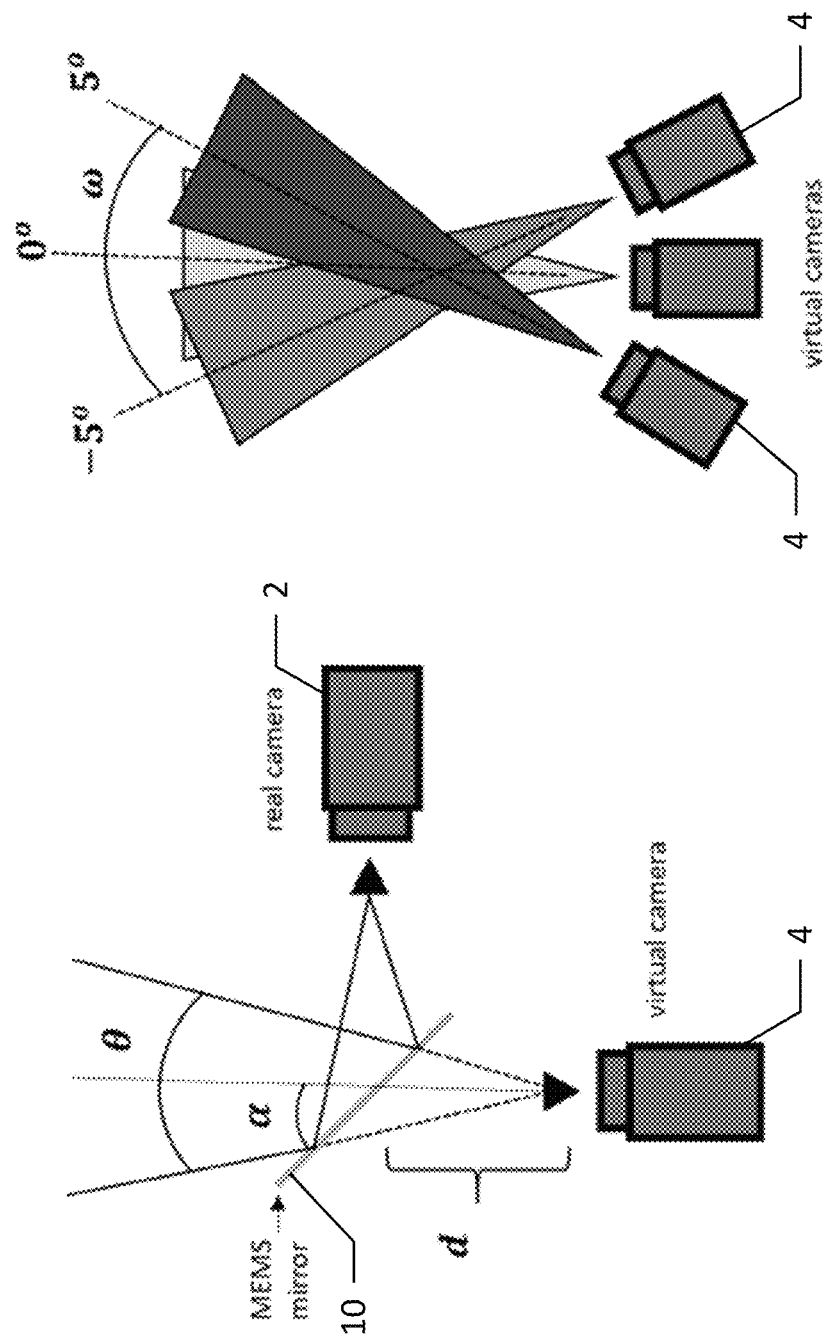
FIG. 4 illustrates virtual camera viewpoints based on motion of the MEMS mirror according to an example embodiment of the present disclosure.

FIG. 4 illustrates that since the MEMS tilt angle ω changes the virtual camera 4 viewpoint, multiple viewpoints may be generated at the inherent speed of the MEMS, which may be in tens of kilohertz (kHz).

The mirror is presumed to fill the field-of-view (FOV) of the camera as shown in FIG. 4, which results from a triangle-based scaling equation. The equation is setup by ray tracing reflection points to behind the mirror, yielding the virtual camera location. The system can then be solved using thin lens equations to determine the distance an object needs to be from the virtual camera to fill and have focus. According to the illustrated embodiment of FIG. 4, from simple triangles, the camera FOV is $$\theta = 2\tan^{-1}\left(\frac{s}{2f}\right),$$

where s is the sensor's longest dimension and f is the camera focal length. Assuming a mirror tilt to the horizontal given by $$\frac{\pi}{4},$$

then the full fill of the mirror requires the satisfaction of the following equations, where M is the largest mirror dimension and d is the mirror-to-camera distance along the optical axis.

$$d = \frac{M}{2}\sin(\alpha)\cot\left(\frac{\theta}{2}\right)$$

The focal lengths for the camera resolutions are selected to target imaging human heads at distances of five to ten meters. In particular, for a M=3.0 millimeters (mm) mirror, a focal length f=35 mm lens and CMOS OV2710 1/2.7" s=5.0 mm camera sensor, whose FOV is filled when the mirror-camera distance is 35 mm. This enables a typical human head to fill the angle θ when standing 205 centimeters (cm) from the virtual camera, allowing multiple to be in the scene at five to ten meter distances while maintaining focus and high resolution on subjects. The angle α of FIG. 4 may be selected to be 45 degrees so an orthogonal relationship between the camera and the virtual camera is upheld to ensure the virtual views do not see the real camera or system optics.

Using the above-described equations, a simple calibration procedure may be employed for a user who provides sensor dimensions, camera lens properties, and MEMS mirror size, as the model calculates the necessary MEMS mirror-camera distance to minimize vignetting, the optimal distance for a face to fill a desired field of view of the image, and the maximum field of view given the tilt of the MEMS mirror. Example embodiments provided herein predict the distance a face needs to be from the virtual camera to fill either the horizontal or vertical fields of view of the camera, and the expected resolution of a face bounding box at this distance.

Exemplary Resolution Calibration

An example embodiment may use a 305 mm×305 mm USAF 1951 Standard Layout chart from Applied Image Inc. to validate the resolution of the system across distances. To be visible in Near Infrared (NIR) Wavelengths, embodiments obtain a custom print of this standard pattern. The system resolution may be determined by inspecting the contrast between the last visible and the first non-visible group of lines. The frequency of the last group and the chart size provides the resolution. To demonstrate resolution robustness of embodiments described herein, experiments were compared with the resolution chart for three scenarios: the mirror described above, the foveating camera with no mirror in the system, and a 12 megapixel smartphone camera. While the camera of the example embodiment included a ⅓-inch sensor, 0.003 mm pixel size, and 35 mm lens resulting in a 1080×1920 resolution, the smartphone camera used a ⅓-inch sensor, 0.00122 mm pixel size, and 4.15 mm lens resulting in a resolution of 3024×2268. The results of the experiment demonstrated that the mirror resulted in a resolution loss (lower frequency) when compared to imaging without the mirror due to blur caused by the MEMS mirror cover glass and adding an element to the light path in general. However, the disclosed system substantially outperforms the 12 megapixel smartphone camera. The average system resolution of the smartphone is 0.00097 cycles/mm, while the average system resolution of the system described herein when imaging the mirror is 0.010 cycles/mm, and without the mirror is 0.018 cycles/mm. Higher cycles/mm indicates that the system is able to detect higher frequencies (distinct lines) on the chart.

Exemplary Cover Glass Calibration

The above described system is tuned to near-infrared (NIR 850 nanometers (nm)) data, which is commonly used for gaze tracking and iris detection due to its invariance to eye-color. For such a wavelength-sensitive application, further calibration is needed to deal with the cover glass that protects the MEMS mirror from dust and other particulates. Removing the cover glass would give an unobstructed light path, but would jeopardize the MEMS mirror safety. Unfortunately, the cover glass generates additional reflections or "ghosting". There are two primary reflections referred to herein as mirror- and cover-reflections. Embodiments described herein calibrate the system to be useful for gaze tracking applications. While there exist techniques to computationally remove artifacts, embodiments described herein remove the artifacts optically to improve signal-to-noise ratio and maintain speed of capture.

Figure 5:
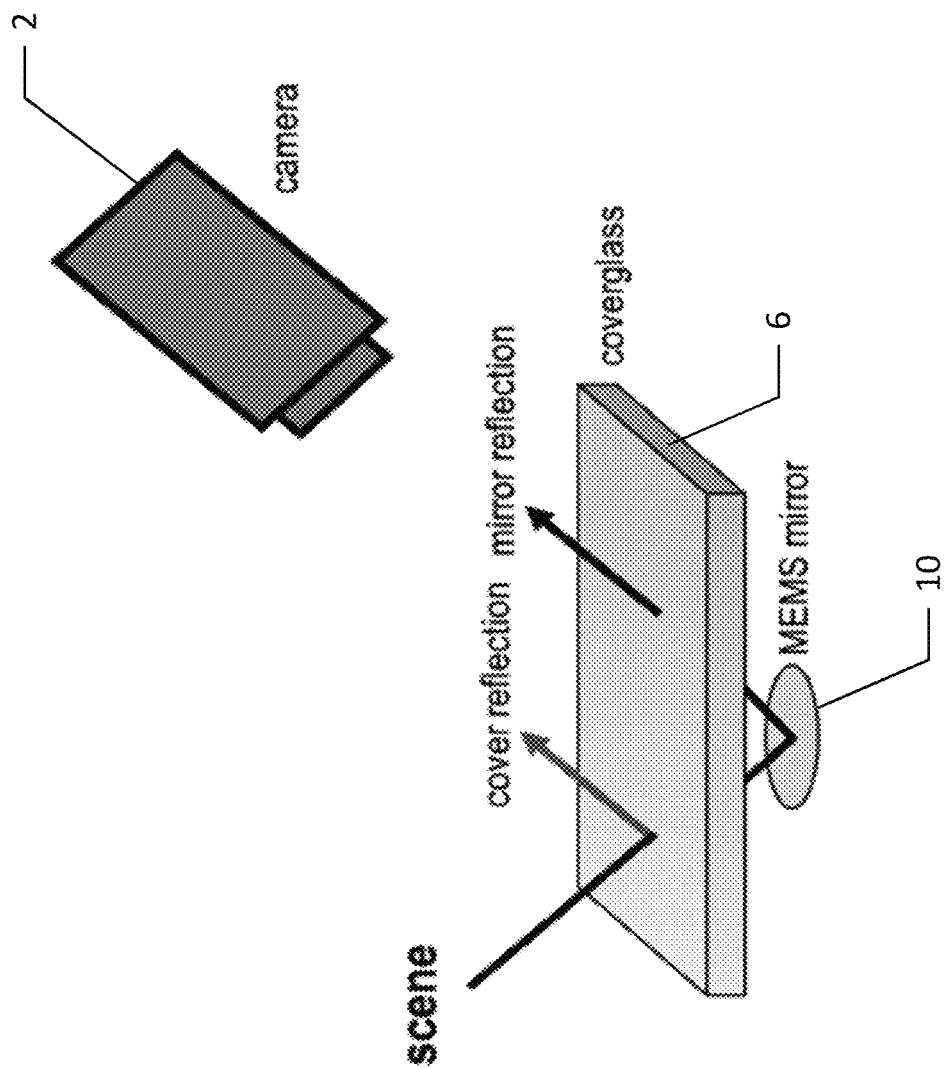
FIG. 5 illustrates a MEMS mirror, and camera with cover glass disposed therebetween according to an example embodiment of the present disclosure.

FIG. 5 illustrates an example embodiment of the camera 2, the MEMS mirror 10, and the cover glass 6 disposed therebetween. To optically remove artifacts and remove ghosting, the angle of incidence is calibrated. The Brewster angle of the cover glass (i.e., the angle at which polarized light completely transmits through a transparent surface) was determined to be 22.5 degrees from cover glass manufacturer specifications, and by adjusting the mirror and camera angles to be near this value, partial cover reflection dampening is achieved. The cover glass transmits wavelengths between 675 nm and 1040 nm, and reflects wavelengths outside of this range. Working within these specifications, a notch filter is selected that transmits wavelengths between 800 nm and 900 nm, and reflects wavelengths outside this range. Combined with an 850 nm NIR light source to illuminate the scene, the reflection from the cover glass is further reduced. Further, an absorbing black paper may be inserted in the center of the virtual camera field of view to remove incident light that would be reflected by the cover glass, and the MEMS mirror is run outside of this region. Together, these elements remove reflected artifacts and ghosting to produce a clear and unobstructed image.

Performance Calibration

In various embodiments, directional control of the MEMS mirror's scan uses a learned model that changes the visual attention, based on a prior scan, to optimize performance on visual tasks (e.g., recognition, tracking, depth perception, etc.). As a result, the camera 2 can enable realistically fast artificial saccades and allows artificial saccadic movements to improve visual task accuracy. In particular, the direction of the MEMS mirrors at any time t is defined as $(\theta(t), \phi(t))$. A "control" camera is defined as a device that provides information I about the scene—noting that the "control" camera could be the proposed device, or could be a secondary camera (e.g., a secondary color camera, thermal camera, event camera, etc.). The control algorithm A takes as input the information collected so far by the secondary camera(s) and outputs a trajectory that the MEMS mirror can follow to optimize the vision task, $A(I)=(\theta(T), \phi(T))$, where T is a series of time instances.

The control algorithm A is jointly learned from data collected previously, and also by using the calibration information from the optical setup described above. This joint optimization using a learning algorithm allows the camera to measure information needed to optimize particular tasks.

Figure 6:
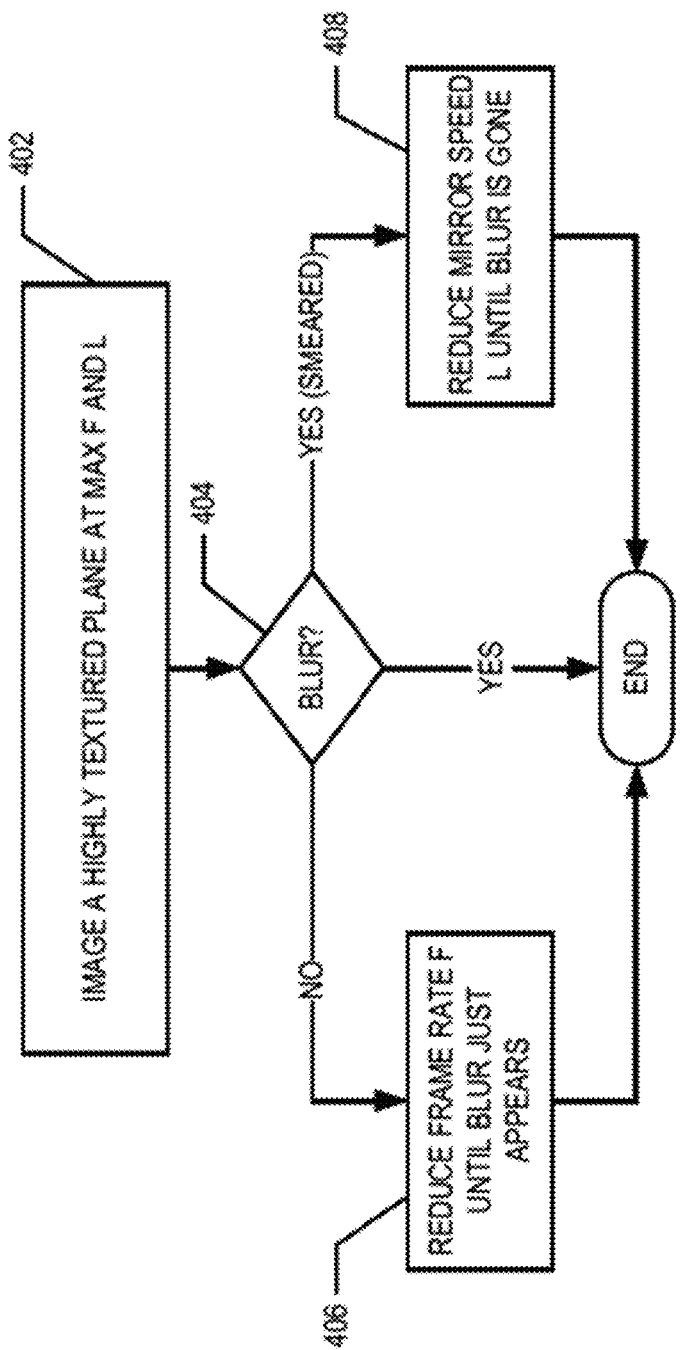
FIG. 6 provides a flowchart illustrating various processes, procedures, and/or operations for calibrating a fast foveation camera according to various embodiments of the present disclosure.

In various embodiments, a calibration algorithm specific to the class of foveated cameras is used to calibrate a fast foveation camera 2. A calibration between the temporal sampling of the high speed camera/imaging sensor (e.g., the camera frame-rate F) and the movement of the optical modulator (e.g., the mirror-speed L of the MEMS mirror in an example embodiment) is performed. FIG. 6 provides a flowchart illustrating various processes, procedures, operations, and/or the like performed to calibrate a fast foveation camera 2 and/or to learn a control algorithm A.

Starting at block 402, an image of a calibration scene is captured using a fast foveation camera 2. For example, a fast foveation camera 2 may be used to image a calibration scene. In various embodiments, the calibration scene is a highly textured scene. In an example embodiment, the highly textured scene is a plane comprising texture such that calibration may be performed without interference from visual effects caused by the topology of the calibration scene. In an example embodiment, the texture is a topological or tactile texture (e.g., ridges, bumps, indents, and/or other features that provide a tactile effect). In an example embodiment, the texture if a visual texture (e.g., comprising gradients of color and/or one or more colors that provide a visual effect). For example, the image of the calibration scene may be captured by the MEMs controller 20 causing the MEMs mirror 10 to move in accordance with a control algorithm A such that a beam of light reflected from the calibration scene is reflected by the MEMs mirror 10 to the high speed passive sensor 30. The high speed passive sensor 30 may capture the beam of light reflected from the calibration scene such that an image of the calibration scene is captured. In an example embodiment, the image is captured by the deep mapping processor 40. For example, the high speed passive sensor 30 provides collected image information/data to the deep mapping processor 40 for processing thereof for the formation and/or capturing of an image (e.g., the image of the calibration scene).

At block 404, the image of the calibration scene is processed and/or analyzed to determine if a blur is present in the image. In various embodiments, the deep mapping processor 40 processes and/or analyzes the image of the calibration scene to determine if a blur is present in the image. In an example embodiment, the deep mapping processor 40 is communication (e.g., wired or wireless communication) with an image processing computing entity 60 and the image processing computing entity 60 processes and/or analyzes the image of the calibration scene to determine if a blur is present in the image. In various embodiments, an amount of blur may be determined (e.g., barely blurred, blurred to the point of smearing, and/or the like).

If, at block 404, it is determined (e.g., by the deep mapping processor 40 and/or the image processing computing entity 60) that there is no blur present in the image of the calibration scene, the process continues to block 406. At block 406, the frame rate F of the fast foveation camera 2 is reduced and the calibration scene is re-imaged. The frame rate F may be reduced until a small blur (e.g., a blur without smearing) is present in the captured image of the calibration scene. For example, the deep mapping processor 40 and/or the image processing computing entity 60 may adjust or cause adjustment of the control algorithm A such that the frame rate F is reduced. The MEMs controller 20 may then control the MEMs mirror 10 in accordance with the adjusted control algorithm A such that the high speed passive sensor 30 provides digital image information/data to the deep mapping processor 40 such that a new image of the calibration scene is captured. The process may then be continued until a small blur (e.g., a blur without smearing) is present in the captured image of the calibration scene.

If, at block 404, a small blur (e.g., a blur without smearing) is present in the captured image of the calibration scene, the process is complete, and the control algorithm A is set. For example, if at block 404, the deep mapping processor 40 and/or the image processing computing entity 60 determines that a small blur (e.g., a blur without smearing) is present in the image of the calibration scene, the calibration process may be determined to be complete and the calibration process may end.

If at block 404, a significant blur (e.g., a blur with smearing) is present in the captured image of the calibration scene, the process continues to block 408. At block 408, the mirror speed L of the fast foveation camera 2 is reduced and the calibration scene is re-imaged. The mirror speed L may be reduced until a small blur (e.g., a blur without smearing) is present in the captured image of the calibration scene. For example, the deep mapping processor 40 and/or the image processing computing entity 60 may adjust or cause adjustment of the control algorithm A such that the mirror speed L is reduced. The MEMs controller 20 may then control the MEMs mirror 10 in accordance with the adjusted control algorithm A such that the high speed passive sensor 30 provides digital image information/data to the deep mapping processor 40 such that a new image of the calibration scene is captured. The process may then be continued until a small blur (e.g., a blur without smearing) is present in the captured image of the calibration scene.

Controlling the MEMS Mirror Motion to Capture a Scene

Given the optically calibrated foveating camera as described above, it is desirable to move the MEMS mirror to best capture the intended scene. As shown in FIG. 2, the camera captures reflections off of the MEMS mirror, whose azimuth and elevation are given by changes in control voltages over time. $(\theta(V(t)), \phi(V(t)))$ over the mirror field of view $(\omega_{mirror})$.

The system bandwidth may be M pixels/second. Given an integer k>0, a camera is used that captures M/k pixel images at k images per second in the foveating sensor. Since the mirror moves quickly, new active vision control is possible to distribute the k instances of the viewing cone within a second. The advantage of MEMS mirrors is the speed of motion, allowing the mirror to scan and quickly attend to a region-of-interest.

Consider a virtual plane perpendicular to the optical axis and parallel to the MEMS mirror in a resting, horizontal state, i.e. $(\theta=0, \phi=0)$. Every angular pose of the MEMS mirror $(\theta, \phi)$ corresponds to a location $(x, y)$ on given perspective scaling. Consider a scene with two targets. According to example embodiments described herein, the focus on targets may be the faces of two people. Long range eye tracking is possible if the mirror moves quickly between the two face locations. To do this, a tight one-dimensional sinusoid of amplitude $$\frac{L_r}{2},$$

bounded by the face locations, with one of the face locations being the "anchor" of the system, $(x_r, y_r)$, while its orientation given by the angle $\alpha_r$ with respect to an arbitrary reference vector, such as one parallel to the lower edge of the MEMS mirror. The state of the sensor may be denoted as the triplet: $q_r=(x_r, y_r, \alpha_r)$, and this state exists in a space of possible configurations given by the sensor hardware limits for one dimensional motion: $\cup=(L_{min}, L_{max}) \times (\omega_{min}, \Omega_{max})$. The problem of control requires a solution that changes the state $q_r$ of the sensor to enable target imaging.

To change the state to match the people's motion around the scene, a control vector $u_r=(v_r, \Omega_r)$ may be defined for a new desired motion by specifying the velocity $v_r$ by which the length of the one-dimensional motion should change and the angular velocity $\omega_r$ by which the angle of the one-dimensional motion should change. An optional Kalman filter may be used to estimate the current state of the MEMS mirror's one-dimensional motion and the face locations, given a previous state and face locations of the desired control vector.

Optional Kalman Filter for State and Target Tracking

A probability distribution of the targets over time is necessary to control the viewing direction of the MEMS mirror in the camera. Embodiments described herein use a vision-based face-tracker as a proxy for the filter to estimate the distribution. However, the Kalman filter tracker may be used. The Kalman filter tracker defines a control matrix that uses the desired control vector and estimates the shift that it induces in the current state of the sensor. If the index is set for time ask, and if an instantaneous time is denoted at $\delta t$, then the control matrix $B_r(k)$ for the state sensor is:

$$B_r(k) = \begin{bmatrix} \cos\alpha_r \delta t & 0 \\ \sin\alpha_r \delta t & 0 \\ 0 & \delta t \end{bmatrix} u_r$$

Where infinitesimal shifts in time result in changes in the length and angle of the MEMS mirror's one-dimensional motion. A prediction for the MEMS mirror state that depends upon the control vector $u_r(k)$:

$$q_r(k+1) = I_3 q_r + B_r(k) u_r(k) + Q_r$$

Where $Q_r$ is the covariance matrices of the MEMS controller and $I_3$ is the identity representing the state transition for a calibrated, controlled sensor (e.g., only the control vector and noise matters in changing the state)

To complete the full predict step, estimates are added to the targets. In tracking two people, their 3D face locations (e.g., the center of their respective faces) project onto the virtual plane $\Pi$ at two 2D locations, given by $q_f=[x_{lf} y_{lf} x_{rf} y_{rf}]$ for the left face and right face.

The full state vector as containing all MEMS mirror information plus the face locations is denoted as: $q(k)=[q_r^T(k)\ q_f^T(k)]^T$. Since there is no control over location of the faces, the full control vector $u(k)=[u_r(k)0]^T$.

For the target faces, the state transition vector is given calculating the optical flow of the left face $[f_{xlf}\ f_{ylf}]$ and the right face $[f_{xrf}\ f_{yrf}]$. To cast optimal flow within the linear Kalman flow equations, a simple trick is employed to convert the 2D vector addition of optical flow to multiplication by setting $$of_1 = \frac{x_{lf} + f_{xlf}}{x_{lf}},\ of_2 = \frac{y_{lf} + f_{ylf}}{y_{lf}},\ of_3 = \frac{x_{rf} + f_{xrf}}{x_{rf}},\ \text{and}$$

$$of_4 = \frac{y_{rf} + f_{yrf}}{y_{rf}}.$$

This enables the specification of a transition matrix:

$$F = \begin{pmatrix} I_3 & 0 \\ 0 & OF \end{pmatrix},\ \text{where}$$

$$OF = \begin{pmatrix} of_1 & 0 & 0 & 0 \\ 0 & of_2 & 0 & 0 \\ 0 & 0 & of_3 & 0 \\ 0 & 0 & 0 & of_4 \end{pmatrix}$$

Augmenting $B(k)=[B_r(k); 0]$, with the full predict equation:

$$q(k+1)=Fq(k)+B(k)u(k)+\omega$$

Where $\omega$ represents the process noise in the MEMS controller and the target motion is denoted by matrices $Q_r$ and $Q_t$. Let the covariance matrix of the state vector (MEMS mirror+target faces) be $P_k=[P_r(k)\ 0;\ 0\ P_t(k)]$ where $P_r(k)$ is the covariance matrix representing the uncertainty in the MEMS mirror state and $P_t(k)$ is the covariance matrix representing uncertainty in the target location. Then the change in uncertainty is:

$$P(k+1)=[B_r(k)^T P_r B_r(k)0;0P_t]+[Q_r(k)0;0Q_t(k)]$$

Where the untracked noise is represented by the covariance terms of the noise in the MEMS controller and the target $Q_r$ and $Q_t$.

The update step for the entire system is given by two types of sensor measurements. The first is the proprioceptive sensor based on voltage measurements made directly with a universal serial bus (USB) oscilloscope that receives the same voltages sent to the MEMS. The second is a camera that views the reflections of the mirror and applies a standard face recognition classifier to each location, determining a probability distribution of left and right face locations across the FOV. From these two measurements both estimated state vector and its covariance can be proposed as $[z(k), R(k)]$. Note that the measurement function (usually denoted as $H(k)$) is the identity in this configuration as all the probability distributions share the same domain (e.g., the 2D plane $\Pi$ created in front of the sensor. The remaining Kalman filter equations are:

$$K' = P(k+1)(P(k+1)+R(k+1))^{-1}$$

$$q'(k+1)=q(k+1)+K'(z(k+1)-q(k+1))$$

$$P'(k+1)=P(k+1)-K'P(k+1)$$

Metrics for Mirror Control

A metric for mirror control may be the difference between the ground truth (unknown) state $q(k)$ and the current state as predicted by the filter $q(k+1)$. However, if there is no face detection, the filter cannot be applied, and the previous state is defaulted to moved by control vector given by $q(k+1)$. With $P_d$, the probability that all faces were detected successfully.

$$M_k=P_d E[e'(k+1)^T e'(k+1)]+(1-P_d)E[e(k+1)^T e(k+1)]$$

where: $e'(k+1)=q(k)-q'(k+1)$ and $e(k+1)=q(k)-q(k+1)$.

Using the trace trick, $M_k$ can be converted into an expression using the covariance matrices:

$$M_k = tr[P(k+1)] - P_d(tr[P(k+1)] - tr[P'(k+1)])$$

Since $tr[P(k+1)]-tr[P'(k+1)]$ is always positive, due to uncertainty reduction of a Kalman filter, maximizing $P_d$ reduces the error $M_k$. This metric for good performance illuminates how to control the MEMS mirror with $u_r$.

Updating the Control Vector

The conclusion of the previous section is depicted as a control law: $\max_{u_r} P_d$, where $P_d$ is defined as the probability that all of the faces are detected, and is given by integrating the probability of seeing a face over the MEMS mirror path given by the state of the sensor $q_r(k)=(x_r(k), y_r(k), \alpha_r(k))$. A gradient-based iterative update to the control vector is now used given the sensor state and uncertainty. Calculating $P_d$ as a slice given a parameter s, locations along which the probability $P_d$ must be integrated can be expressed as:

$$P_d(q_r(k)) = \int_{s=0}^{L} f_t(x_r(k)+s\cos\alpha_r(k), y_r(k)+s\sin\alpha_r(k))ds$$

Where $f_t$ is the probability distribution function of the faces of the canonical plane $\Pi$. The distribution $f_t$ comes from the estimates of face location, which could be from the Kalman filter described above or from another process, and can be modeled as an air of bi-variate Gaussian distributions, of equal weight (e.g., the mixing parameter is 0.5), such that $f_t(x, y) = f_l(x, y) + f_r(x, y)$, where each Gaussian component centered at two previously estimated left and right face locations given by $q_f(k-1) = [x_{lf}(k-1)\ y_{lf}(k-1)\ x_{rf}(k-1)\ y_{rf}(k-1)]$. Said differently, $P_d$ is an integral along a slice through two bivariate Gaussian distributions. For each left and right case, the correlation matrix is known of both 2D Gaussians, from the Kalman filter, given by $[\sigma_{1l}\sigma_{2l}\rho_l]$ for the left and $[\sigma_{1r}\sigma_{2r}\rho_r]$ for the right. Thus, the term $f_t(x_r(k)+s\cos\alpha_r(k), y_r(k)+s\sin\alpha_r(k))$ can be split into two components, where $x=x_r(k)+s\cos\alpha_r(k)$ and $y=y_r(k)+s\sin\alpha_r(k)$, the first given by $f_l(x, y)$:

$$\frac{1}{2\pi\sigma_{1l}\sigma_{2l}\sqrt{1-\rho_l^2}} e^{-\frac{\frac{(x-x_{lf})^2}{\sigma_{1l}^2} - \frac{2\rho_l(x-x_{lf})(y-y_{lf})}{\sigma_{1l}\sigma_{2l}} + \frac{(y-y_{lf})^2}{\sigma_{2l}^2}}{2(1-\rho_l^2)}}$$

And the second given by $f_r(x, y)$:

$$\frac{1}{2\pi\sigma_{1r}\sigma_{2r}\sqrt{1-\rho_r^2}} e^{-\frac{\frac{(x-x_{rf})^2}{\sigma_{1r}^2} - \frac{2\rho_r(x-x_{rf})(y-y_{rf})}{\sigma_{1r}\sigma_{2r}} + \frac{(y-y_{rf})^2}{\sigma_{2r}^2}}{2(1-\rho_r^2)}}$$

Gradient Descent

Maximizing the value of $P_d$ can be tackled with gradient descent. First, it is established that $P_d$ has at most two global maxima by linking it to the well-known Radon transform.

Next, it is shown that this formulation of $P_d$ is bounded. For Global maxima: $P_d$ is obtained by slicing through the two Gaussians at a line segment given by $q_r=(x_r, y_r, \alpha_r)$. By reconstituting this as a slice through a line with y intercept $y_{rad}=y_r+x_r*(\tan(\alpha_r))$ and slope $s_{rad}=\tan(\alpha_r)$, it is identified that $P_d$ is the Radon transformation of a bi-variate distribution. For each Gaussian distribution individually, this transform has been shown to be unimodal with a global maxima and continuous for a zero-mean Gaussian. As translations and affine transformations do not affect the radon transform, these hold for any Gaussian distribution. For the sum of Radon transforms of two such Gaussians, there can be at most two global maxima (if these are equal) and at least one maxima (if these overlap perfectly). Further, since the sum of two continuous functions is also continuous, the Radon transform of the bi-variate distribution is also continuous. Finally, the Radon transform is computationally burdensome for a robot to compute at every frame, which supports using iterative gradient descent.

For Bounded domain: any slice through the bi-variate distribution is considered. For example, a slice that has the centers of the two Gaussians on the same side of the slice. By moving the slice toward the two centers, both components of $P_d$ can be increased exponentially and monotonically. So such a slice cannot maximize $P_d$. From the above, the slice that maximizes $P_d$ goes through a line segment between the centers of the two Gaussians. Note that the optimal slice must intersect this line segment somewhere. Said differently, the domain within the Radon transform of the bi-variate Gaussians, where the maximal slice is sought, is bounded.

For Optimal path not the line joining Gaussians' center: While the line joining the Gaussians' center is a useful heuristic, it is not a general solution since the length of the integral L could be smaller than the distance between the Gaussian centers. Secondly, the heuristic tends to work when the Gaussians are similar. If one Gaussian dominates, the optimal line can be different. From these arguments of bounded domain and continuity, the application of gradient descent is a reasonable strategy for lightweight optimization of control law.

For Gradient descent, the Jacobian (i.e. derivatives) of $P_d(q_r(k+1))$ given by $u_r$ are computed:

$$\frac{\delta P_d(q_r(k+1))}{\delta u_r} = \frac{\delta P_d(q_r(k+1))}{\delta q_r(k+1)} \frac{\delta q_r(k+1)}{\delta u_r}$$

Since the second term is the sensor motion model, $B_r(k)\delta t$, the first term needs to be calculated:

$$\frac{\delta P_d(q_r(k+1))}{\delta u_r(k+1)} = \begin{bmatrix} \frac{\delta}{\delta x_r} P_d(q_r(k+1)) \\ \frac{\delta}{\delta y_r} P_d(q_r(k+1)) \\ \frac{\delta}{\delta \alpha_r} P_d(q_r(k+1)) \end{bmatrix}$$

Setting $x=x_r(k)+s \cos \alpha_r(k)$ and $y=y_r(k)+s \sin \alpha_r(k)$, and by splitting $f_r$ into left and right Gaussians, the above can be rewritten as:

$$\frac{\delta P_d(q_r(k+1))}{\delta u_r(k+1)} = \begin{bmatrix} \frac{\delta}{\delta x_r} \int_{s=0}^{L} f_l(x,y)ds \\ \frac{\delta}{\delta y_r} \int_{s=0}^{L} f_l(x,y)ds \\ \frac{\delta}{\delta \alpha_r} \int_{s=0}^{L} f_l(x,y)ds \end{bmatrix} + \begin{bmatrix} \frac{\delta}{\delta x_r} \int_{s=0}^{L} f_r(x,y)ds \\ \frac{\delta}{\delta y_r} \int_{s=0}^{L} f_r(x,y)ds \\ \frac{\delta}{\delta \alpha_r} \int_{s=0}^{L} f_r(x,y)ds \end{bmatrix}$$

These gradients can be calculated after every iteration of the Kalman filter, allowing for the closed form update of the MEMS mirror based on the movement of the faces, sensor state, and uncertainty.

Remote Eye-Tracking for Frontal Faces

Remote eye-tracking for frontal faces has potential applications in situations where the faces are directly viewed by the camera, such as for human-robot interaction, automobile safety, smart homes, and in educational/classroom settings. Remote eye-tracking using the disclosed foveating camera provides improvements over conventional methods through use of the MEMS mirror enabled foveating camera to capture images and using a convolutional neural network to analyze the images. Embodiments are able to track the gaze of multiple people at greater distance than conventional eye-tracking methods.

Exemplary Post-Processing

In various embodiments, one or more post-capture algorithms specific to the class of foveated cameras are used to perform post-processing of images captured by a fast foveation camera 2. In various embodiments, a post-processing method is used to remove imaging artifacts from the image(s) captured by the fast foveation camera 2 and improve the fidelity of the imaging camera, in various embodiments. In particular, the motion of the MEMS mirror in resonance is not equiangular. This results in non-uniform sampling and different noise characteristics for different directions of movement of the mirror. Our method follows from the calibration, and since we know the direction of the MEMS mirror for each measurement of the camera, we can project these onto the hemisphere of directions (i.e. an environment map centered at the camera) and perform angular-based image processing to allow for super resolution and denoising.

Exemplary Composite Camera

Figure 7:
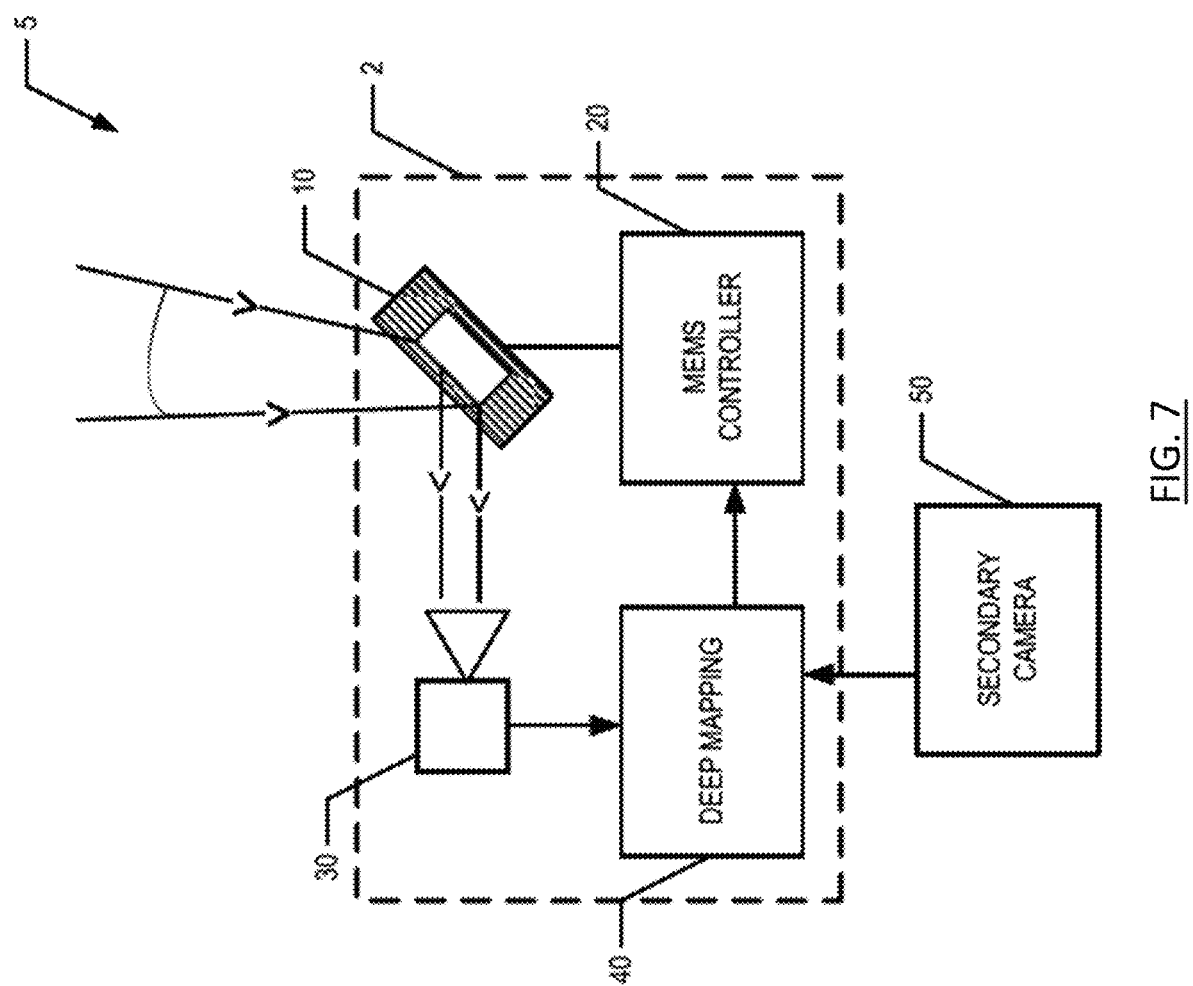
FIG. 7 is a schematic block diagram of an example composite camera comprising a secondary camera and a fast foveation camera according to various embodiments of the present disclosure.
Figure 8:
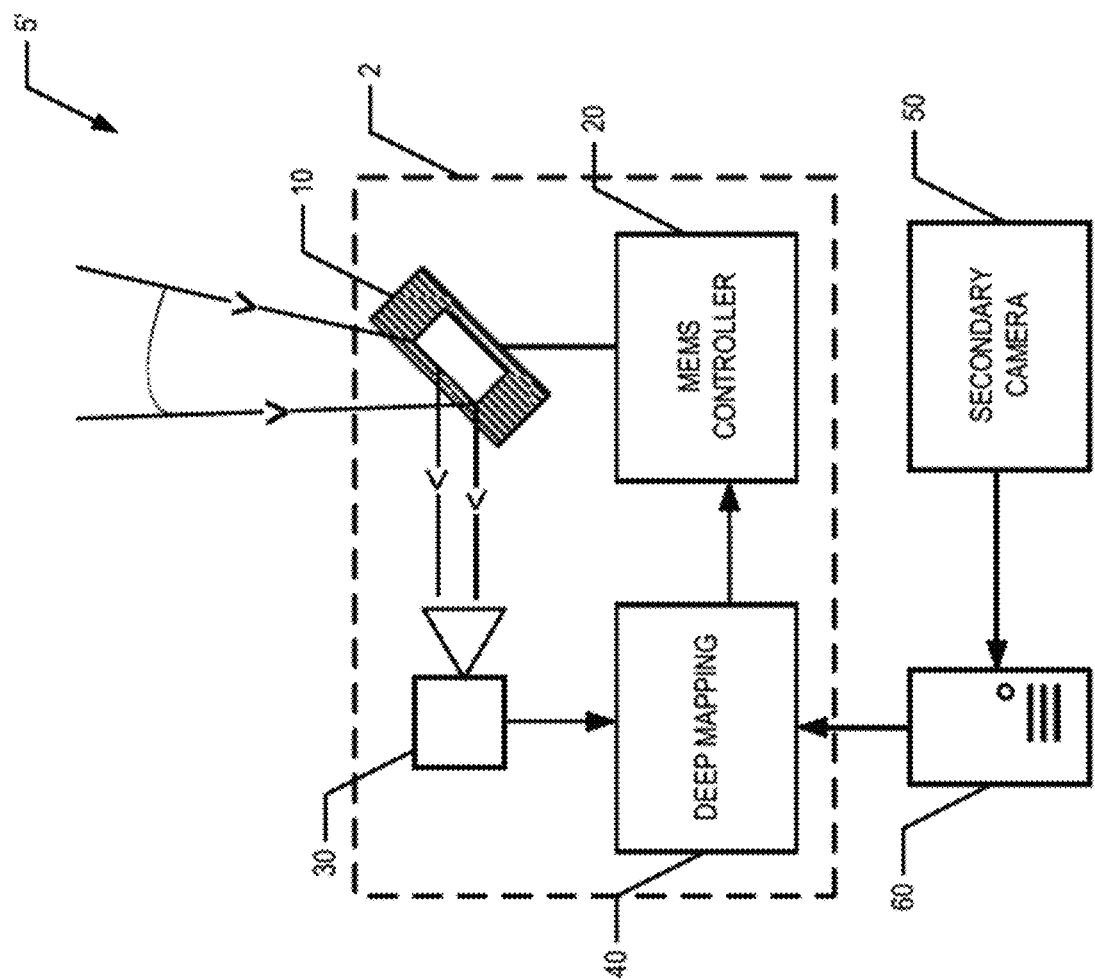
FIG. 8 is a schematic block diagram of another example composite camera comprising a secondary camera and a fast foveation camera according to various embodiments of the present disclosure.

FIGS. 7 and 8 illustrate two example embodiments of a composite camera 5, 5' comprising a fast foveation camera 2. Various embodiments of composite camera may comprise multiple fast foveation cameras 2. In various embodiments, the composite camera 5, 5' further comprises a secondary camera 50. In various embodiments, the secondary camera 50 may be a fast foveation camera 2, a digital (optical) camera (e.g., a color camera), thermal (e.g., infrared) camera, event camera, ultra-violet camera, and/or other camera. In various embodiments, the secondary camera 50 is configured, oriented, aligned, and/or the like such that the field of view of the secondary camera 50 at least partially overlaps with the field of view a fast foveation camera 2 of the composite camera 5, 5'. In an example embodiment, the secondary camera 50 is in direct communication with the fast foveation camera 2 (e.g., the deep mapping processor 40) via a wired or wireless connection. In an example embodiment, the secondary camera 50 is in directed communication with an image processing computing entity 60 and in indirect communication with a fast foveation camera 2 (e.g., via the image processing computing entity 60). For example, an example embodiment of a composite camera 5' comprises a secondary camera 50 in communication with an image processing computing entity 60 that is in communication with a fast foveation camera 2 (e.g., deep mapping processor 40). In various embodiments, the secondary camera 50 is configured to capture a first image of a scene (e.g., an optical image, thermal image, UV image, and/or the like). The image processing computing entity 60 and/or deep mapping processor 40 is configured to receive the first image of the scene captured by the secondary camera 50 and process and/or analyze the first image of the scene to identify one or more areas of interest within the scene. The deep mapping processor 40 may then cause the MEMs controller 20 to control the MEMs mirror 10 such that one or more second images are captured. In various embodiments, the one or more second images are each an image of an area of interest within the scene. In various embodiments, the one or more second images are of higher resolution (e.g., higher angular resolution) than the first image.

Exemplary Use of a Composite Camera

Figure 9:
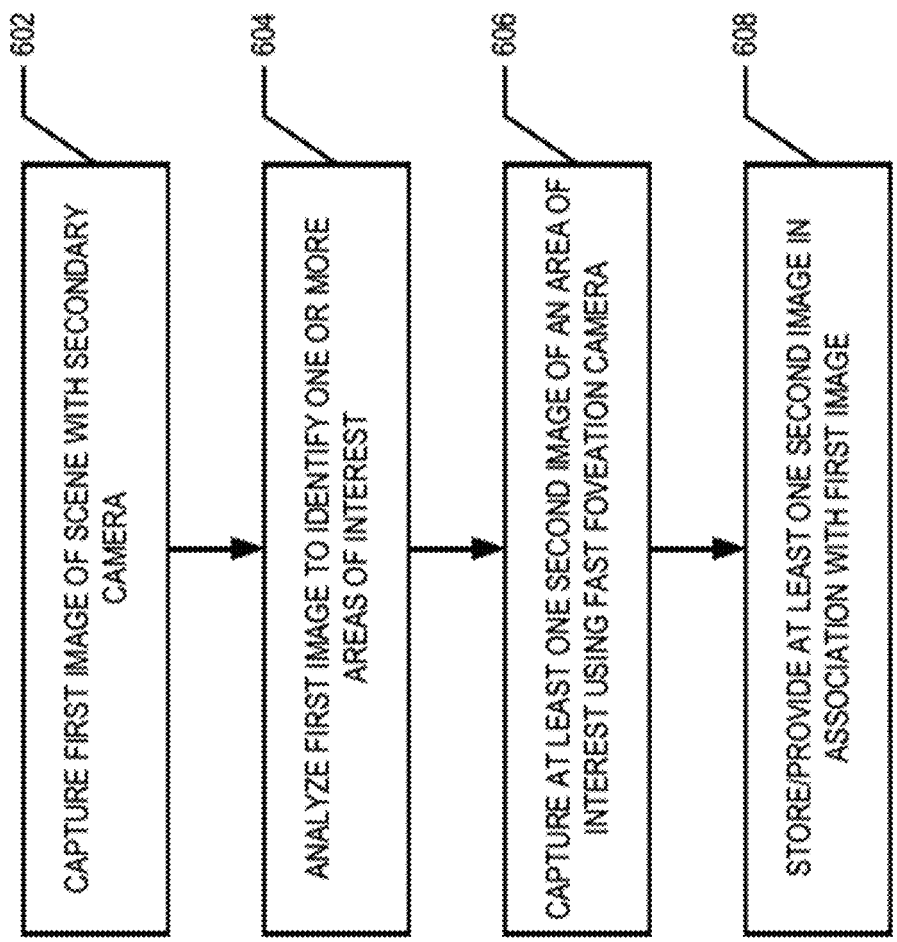
FIG. 9 provides a flowchart illustrating various processes, procedures, and/or operations for generating secondary images corresponding to an area of interest of a first image suing a composite camera according to various embodiments of the present disclosure.

FIG. 9 provides a flowchart illustrating various processes, procedures, operations, and/or the like for imaging a scene using a composite camera 5, 5'. Starting at block 602, a first image of a scene is captured with the secondary camera 50. For example, a secondary camera 50 captures a first image of a scene.

At block 604, the first image of the scene is processed and/or analyzed to identify one or more areas of interest within the scene. For example, the secondary camera 50 may provide the first image such that an image processing computing entity 60 and/or deep mapping processor 40 receives the first image and processes and/or analyzes the first image to identify one or more areas of interest within the scene. In an example embodiment, the one or more areas of interest within the scene are each within a field of view of at least one fast foveation camera 2 of the composite camera 5, 5'.

At block 606, at least one second image is captured. Each second image is an image of an area of interest identified within the scene. In an example embodiment, the resolution of a second image is higher than the resolution of the first image. In various embodiments, a fast foveation camera 2 of the composite camera 5, 5' is used to capture a second image. For example, the deep mapping processor 40 may cause the MEMs controller 20 to control the MEMs mirror 10 such that the high speed passive sensor 30 captures digital image information/data that is provided to the deep mapping processor 40 such that the deep mapping processor 40 captures a second image of an area of interest within the scene.

At block 608, the at least one second image is associated with the first image and stored and/or provided. For example, the deep mapping processor 40 may associate the at least one second image with the first image and provide and/or store the first and second images. For example, the deep mapping processor 40 may provide the at least one second image such that an image processing computing entity 60 receives the second image, associates the second image with the first image, and stores (e.g., in memory 210, 215, see FIG. 10) and/or provides the first and second images (e.g., via communications interface 220 or a user interface).

Exemplary Image Processing Computing Entity

Figure 10:
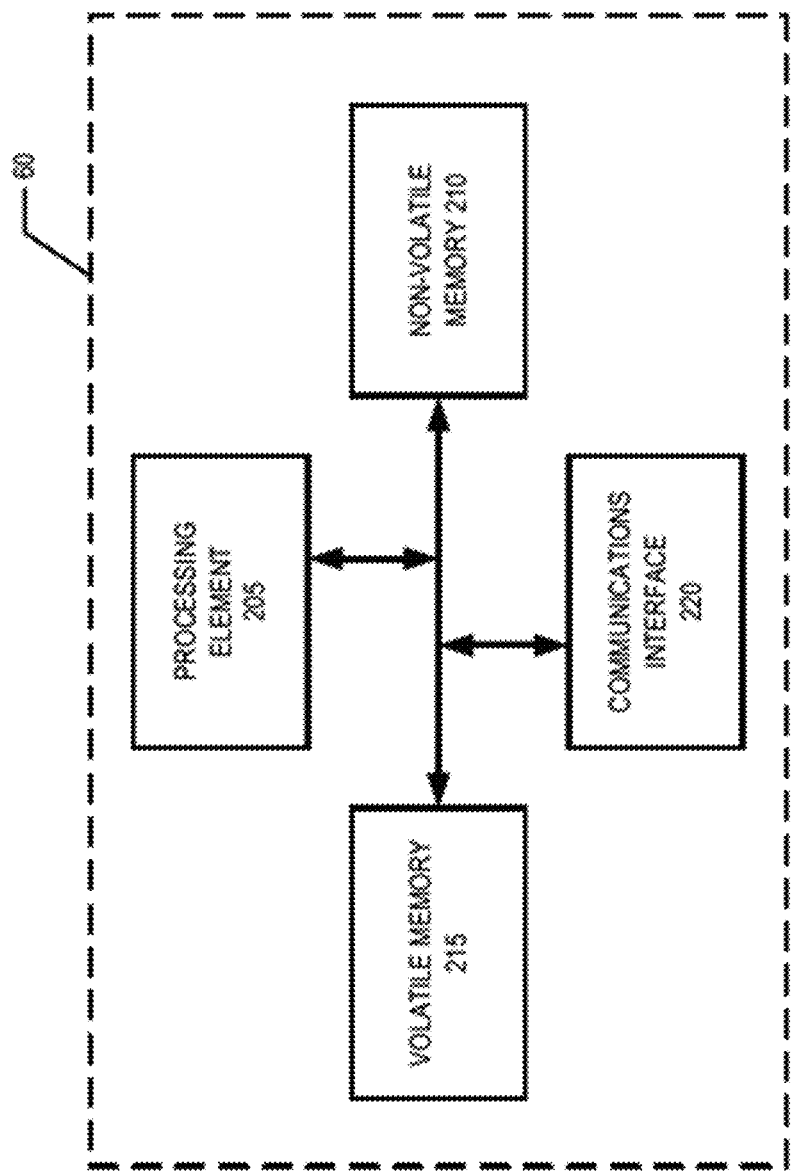
FIG. 10 is a schematic block diagram of an example image processing computing entity according to various embodiments of the present disclosure.

In various embodiments, one or more image processing computing entities 60 may be used to perform one or more calibration steps for calibrating a fast foveation camera 2, learning a control algorithm A, performing post-processing of an image captured by a fast foveation camera 2, processing an image captured by a secondary camera 50 of a composite camera, and/or the like. FIG. 10 provides a schematic of an image processing computing entity 60 according to one embodiment of the present invention. In general, the terms computing entity, entity, device, system, and/or similar words used herein interchangeably may refer to, for example, one or more computers, computing entities, desktop computers, mobile computing entities, laptops, distributed systems, servers or server networks, processing devices, processing entities, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the image processing computing entity 60 includes one or more communications interfaces 220 for communicating with various computing entities, such as by communicating data, content, information, and/or similar terms used herein interchangeably that can be transmitted, received, operated on, processed, displayed, stored, and/or the like. For instance, the image processing computing entity 60 may communicate with secondary camera 50, deep mapping processor 40, and/or the like.

As shown in FIG. 7, in one embodiment, the image processing computing entity 60 includes or is in communication with one or more processing elements 205 (also referred to as processors, processing circuitry, and/or similar terms used herein interchangeably) that communicate with other elements within the image processing computing entity 60 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), graphics processors, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the image processing computing entity 60 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the image processing computing entity 60 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the image processing computing entity 60 with the assistance of the processing element 205 and operating system.

As indicated, in one embodiment, the image processing computing entity 60 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the image processing computing entity 60 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The image processing computing entity 60 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), Hypertext Markup Language (HTML), and/or the like.

As will be appreciated, one or more of the image processing computing entity's 60 components may be located remotely from other image processing computing entity 60 components, such as in a distributed system. Furthermore, one or more of the components may be combined and additional components performing functions described herein may be included in the image processing computing entity 60. Thus, the image processing computing entity 60 can be adapted to accommodate a variety of needs and circumstances.

In an example embodiment, the image processing computing entity 60 further comprises and/or is in communication with one or more user interface devices. For example, the user interface devices comprise user input devices and/or user output devices, in various embodiments. Some examples of user input devices include a touch screen, soft or hard keyboard, mouse, touchpad, microphone, and/or the like. Some examples of user output devices include a display, monitor, speaker, 2D or 3D printer, and/or the like. In various embodiments, the image processing computing entity 60 is configured to provide an interactive user interface via the one or more user interface devices.

In example embodiments, the image processing computing entity 60 may be in communication with one or more other secondary cameras 50, deep mapping processors 40, and/or other computing entities.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A camera comprising:
a passive sensor;
a dynamic optical modulator;
an optical modulator controller configured to control an orientation of the dynamic optical modulator; and
a processor configured to receive digital image data from the passive sensor and to control the optical modulator controller, wherein the dynamic optical modulator is configured to reflect a beam of light from a scene of interest onto the passive sensor, wherein the processor is configured to control the optical modulator controller in accordance with a control algorithm, and wherein the control algorithm provides a mirror speed for movement of the dynamic optical modulator and a frame-rate speed for capturing digital image data by the passive sensor, wherein the mirror speed and the frame-rate speed are calibrated by:
(a) an image is captured of a calibration scene using the camera;
(b) analysis of the image is performed to determine if a blur is present in the image;
(c) (i) reduction of a frame rate of the camera and returning to step (a) in response to a determination that no blur is present in the image;
(ii) reduce a mirror speed of the dynamic optical modulator and returning to step (a) in response to a determination that a blur above a predetermined size is present in the image; and
(iii) determine that the control algorithm is calibrated in response to a determination that a blur below the predetermined size is present in the image.

2. The camera of claim 1, wherein the passive sensor is a CCD or CMOS image sensor.

3. The camera of claim 1, wherein the dynamic optical modulator is a scanning mirror or an array of scanning mirrors.

4. The camera of claim 1, wherein the dynamic optical modulator is a MEMs mirror or an array of MEMs mirrors.

5. The camera of claim 4, wherein each MEMs mirror comprises a plurality of microactuators.

6. The camera of claim 5, wherein a central reflective mirror plate of each MEMs mirror is suspended by four microactuators.

7. The camera of claim 6, wherein each of the microactuators are configured to be electrically controlled to set a height of a corresponding edge of the central reflective mirror plate, the microactuator being anchored to the corresponding edge.

8. The camera of claim 5, wherein each of the microactuators is made of a folded thin-film beam.

9. The camera of claim 5, wherein the optical modulator controller is configured to control each of the microactuators.

10. The camera of claim 1, further comprising a cover glass positioned between the dynamic optical modulator and the passive sensor, wherein the passive sensor and the dynamic optical modulator are positioned at angles relative to the cover glass established to dampen reflections from the cover glass.

11. A composite camera comprising:
a secondary camera,
a primary camera, wherein the primary camera is the camera of claim 1.

12. The composite camera of claim 11, wherein the secondary camera is one of an optical camera, a thermal camera, or an ultra-violet camera.

13. The composite camera of claim 11, wherein a field of view of the secondary camera and a field of view of the primary camera overlap at least in part.

14. The composite camera of claim 11, wherein the secondary camera is configured to capture a first image of a scene and the primary camera is configured to capture one or more second images, each of the second images being of an area of interest within the scene.

15. The composite camera of claim 14, wherein each second image has a higher resolution than the first image.

16. The composite camera of claim 14, configured to associate with one or more second images with the first image and provide and/or store the first and second images.

17. The composite camera of claim 14, wherein a field of view of the secondary camera and a field of view of the primary camera only partially overlap.

18. A method of imaging a scene with a composite camera, the composite camera being the composite camera of claim 11, the method comprising:
capturing a first image of a scene with the secondary camera;
analyzing the first image with a processor to identify one or more areas of interest within the scene;
causing the optical modulator to control the dynamic optical modulator such that the primary camera captures one or more second images, each second image being an image of one of the one or more areas of interest within the scene;
associating the first and second images; and
storing and/or providing the first and second images.

19. The method of claim 18, wherein each second image has a higher resolution than the associated first image.

20. The method of claim 18, further comprising performing post-processing on at least one second image to remove imaging artifacts from the at least one second image.

21. A method for calibrating a control algorithm for a mirror speed relative to a frame rate, the method comprising:
(a) capturing an image of a calibration scene using a camera;
(b) analyzing the calibration scene to determine if a blur is present in the image;
(c) (i) responsive to determining that no blur is present in the image, reducing a frame rate of the camera and returning to step (a);
(ii) responsive to determining that a blur above a predetermined size is present in the image, reducing a mirror speed of a dynamic optical modulator and returning to step (a); and
(iii) responsive to determining that a blur below the predetermined size is present in the image, determining that the control algorithm is calibrated.

22. The method of claim 21, wherein the calibration scene is a textured scene.

23. The method of claim 22, wherein the calibration scene is a texture plane.

24. The method of claim 22, wherein the textured scene is textured with at least one of a tactile texture or a visual texture.

* * * * *